US00RE40149E

(19) United States
(12) Reissued Patent
Vitenberg

(10) Patent Number: US RE40,149 E
(45) Date of Reissued Patent: Mar. 11, 2008

(54) METHOD AND APPARATUS FOR RF COMMON-MODE NOISE REJECTION IN A DSL RECEIVER

(75) Inventor: Roman Vitenberg, Petach-Tikwa (IL)

(73) Assignee: STMicroelectronics, N.V. (NL)

(21) Appl. No.: 10/956,017

(22) Filed: Sep. 30, 2004

Related U.S. Patent Documents

Reissue of:
(64) Patent No.: 6,459,739
Issued: Oct. 1, 2002
Appl. No.: 09/476,746
Filed: Dec. 30, 1999

(51) Int. Cl.
*H04B 3/50* (2006.01)

(52) U.S. Cl. ..... 375/258; 375/349; 375/350; 379/416; 333/12

(58) Field of Classification Search ..... 375/257, 375/258, 346, 349, 350; 379/416; 333/12
See application file for complete search history.

(56) References Cited

U.S. PATENT DOCUMENTS 5,223,806 A * 6/1993 Curtis
5,832,032 A * 11/1998 Overbury ..... 370/201
6,052,420 A * 4/2000 Yeap et al. ..... 375/258
6,173,021 B1 * 1/2001 Bingel et al. ..... 375/257
6,546,057 B1 * 4/2003 Yeap ..... 375/285
6,683,913 B1 * 1/2004 Kantschuk ..... 375/258
6,803,859 B2 * 10/2004 Hilliard et al. ..... 340/941

FOREIGN PATENT DOCUMENTS

EP 0 626 767 * 11/1994
WO WO 97/40587 * 10/1997
WO WO 99/63675 * 12/1999

OTHER PUBLICATIONS

Cioffi, J. et al, "Analog RF Cancellation with SDMT (96–084)", T1E1.4 VDSL (Project), Amati Communications Corp., Mt. View, Calif. (USA), pp. 1–9, Apr. 22, 1996.*

* cited by examiner

*Primary Examiner*—Dac V. Ha
(74) *Attorney, Agent, or Firm*—Lisa K. Jorgenson; William A. Munck

(57) ABSTRACT

A receiver for high-speed data communications, which receives a differential signal through a pair of signal lines. The receiver includes a common-mode choke, which has first and second signal windings, which are respectively coupled in series to the pair of signal lines so as to attenuate common-mode interference in the differential signal. The choke also has a sampling winding, which is inductively coupled to the signal windings so as to generate a sampled signal responsive to current flowing in the signal windings. Signal processing circuitry is coupled to receive the sampled signal from the sampling winding and to receive the differential signal from the signal windings and to process the differential signal responsive to the sampled signal.

27 Claims, 2 Drawing Sheets

METHOD AND APPARATUS FOR RF COMMON-MODE NOISE REJECTION IN A DSL RECEIVER

Matter enclosed in heavy brackets [ ] appears in the original patent but forms no part of this reissue specification; matter printed in italics indicates the additions made by reissue.

FIELD THE INVENTION

The present invention relates generally to high-speed data communications over telephone cables, and specifically to methods and systems for rejection of radio frequency (RF) noise in Digital Subscriber Line (DSL) modems.

BACKGROUND OF THE INVENTION

Digital Subscriber Line (DSL) is a modem technology that enables broadband digital data to be transmitted over twisted-pair wire. This is the type of infrastructure that links most home and small business subscribers to their telephone service providers. DSL modems enable users to access digital networks at speeds tens to hundreds of times faster than current analog modems and basic ISDN service. DSL thus opens the most critical bottleneck in local-loop access to high-speed networks, such as Asynchronous Transfer Mode (ATM) and Internet Protocol (IP) networks, without requiring major investments in new infrastructure. DSL systems use special line signals that are well-adapted to the characteristics of twisted-pair wire and to the noise that normally exists on telephone lines.

A range of DSL standards have been defined, known generically as "xDSL," wherein the various standards have different data rates and other associated features but share common principles of operation. These standards include High-Speed DSL (HDSL), at relative low frequencies (<500 kHz); Asymmetric DSL (ADSL), with an intermediate frequency range (30∝1100 kHz); and Very High Speed DSL (VDSL), in a high frequency range (0.3–20 MHz). VDSL modems support the highest possible bit rates on existing twisted-pair wire. Downstream bit rates of up to 50Mb/sec support such demanding services as video on demand. It is expected that in the near future, VDSL systems will come to dominate subscriber equipment on the telephone network.

One problem of VDSL implementation is that the frequency band of VDSL (up to 20 MHz) overlaps with several RF bands used for amateur radio and radio broadcast transmissions. To avoid interference between VDSL and RF systems, new standards propose that VDSL systems not transmit in RF bands assigned for radio use. But to avoid interference from existing RF systems, VDSL modems must be designed with reduced sensitivity to RF signals. Twisted-pair wire is particularly prone to picking up interference signals from external RF sources. This problem becomes more severe the higher the transmission frequency and can cause significant degradation of VDSL signals.

One method known in the art for rejection of RF interference signals is to use a common mode choke in the twisted-pair telephone line. The common mode choke attenuates RF noise by about 30 dB, but this attenuation is not enough for long cables, wherein the VDSL line signal is typically very small and the RF noise may be large.

Another method for decreasing sensitivity to RF interference is noise cancellation, as described, for example, in PCT Patent Application PCT/US97/06381, published as WO 97/40587, whose disclosure is incorporated herein by reference. This application describes a receiver system for high-speed data communications, such as ADSL or VDSL, having a RF noise canceller. The noise canceller adaptively estimates the radio frequency noise coming into the receiver through twisted pair input lines. The estimate is used to generate a noise cancellation signal, which is subtracted from the signals coming into the receiver. The noise estimate is based on a common-mode reference noise signal, which is sampled at a transformer that couples the input lines to the receiver. The preferred source of the common-mode signal is from a center tap on the input side of the transformer, taken with reference to a chassis ground. It is noted that the common-mode signal could alternatively be obtained from one of the input lines or from the sum of the lines with respect to ground.

The technical solution proposed by PCT/US97/06381 has several disadvantages which make its practical realization difficult. Existing communication standards require that the primary winding of the line transformer be isolated from chassis ground and from the secondary winding. The breakdown voltage of this isolation must be at least 1500 VAC. Therefore, a common mode reference noise signal from the center tap of the primary winding cannot be connected directly to the RF noise canceller, and an additional high-voltage transformer is required between the center tap of the line transformer and the RF noise canceller. A further difficulty with this solution is that it allows RF common mode noise to reach the primary winding of the line transformer without any attenuation. Because of inter-winding capacitance of the transformer, a strong noise signal arises on the secondary winding of transformer, as well. This noise signal can typically be cancelled by appropriate noise cancellation. But if a digital noise canceller is to be used (generally the most practical solution), the high input noise level makes it necessary to use a costly analog/digital (A/D) converter with high dynamic range.

SUMMARY OF THE INVENTION

It is an object of some aspects of the present invention to provide improved devices and methods for sampling common-mode signals.

It is a further object of some aspects of the present invention to provide an improved circuit and method for noise cancellation in a high-speed data receiver.

In preferred embodiments of the present invention, a common-mode choke, used at the input to a high-speed data receiver, has three windings on a common core. The receiver typically comprises a DSL receiver. Two of the windings, termed herein signal windings, are coupled in series with respective input lines carrying an input signal to the receiver. The signal windings are wound together in parallel, preferably using bifilar wire, so as to present a high effective impedance to common-mode RF interference on the input lines, while presenting a low effective impedance to a differential signal between the input lines. The choke thus attenuates the RF interference relative to the signal. The third winding, termed herein a sampling winding, samples the RF common-mode interference on the line. The sampled RF interference is used by a noise cancellation circuit in the receiver to estimate and subtract out interference remaining in the input signal following the choke.

The three-winding choke of the present invention thus provides two stages of interference suppression in a single device: a first stage of attenuation by the high common-mode impedance of the choke itself, and a second stage of RF noise suppression by the noise cancellation circuit. It thus provides superior attenuation of RF interference, without the need for a resistive tap off the input lines to the receiver, as is used in noise cancellation circuits known in the art, such as that described in the above-mentioned PCT patent application. Therefore, it also eliminates the requirement that the sampled common-mode interference signal be referred to ground, and protects the noise cancellation circuit from high-voltage surges.

In some preferred embodiments of the present invention, the high-speed data receiver is used in a DSL modem, most preferably in a VDSL modem. It will be appreciated, however, that the principles of the present invention may similarly be applied to high-speed data receivers of other types.

There is therefore provided, in accordance with a preferred embodiment of the present invention, a receiver for high-speed data communications, which is adapted to receive a differential signal through a pair of signal lines, the receiver including:

a common-mode choke, including:

first and second signal windings, which are configured to be respectively coupled in series to the pair of signal lines so as to attenuate common-mode interference in the differential signal; and a sampling winding, which is inductively coupled to the signal windings so as to generate a sampled signal responsive to current flowing in the signal windings; and signal processing circuitry, which is coupled to receive the sampled signal from the sampling winding and to receive the differential signal from the signal windings and to process the differential signal responsive to the sampled signal.

Preferably, the sampled signal is generated responsive to the common-mode interference, and the circuitry processes the differential signal to cancel the attenuated common-mode interference out of the differential signal. Most preferably, the circuitry processes the sampled signal to derive an estimate of the common-mode interference, which is subtracted from the differential signal. Further preferably, the sampled signal is conveyed to the processing circuitry substantially without reference to a ground.

Preferably, the sampling winding is electrically isolated from the signal windings.

In a preferred embodiment, the receiver includes a transformer, which includes a primary winding coupled to receive the differential signal from the signal windings of the choke and a secondary winding coupled to convey the differential signal to the signal processing circuitry, wherein the primary winding includes a center tap which is grounded.

Preferably, the pair of signal lines includes a twisted pair of lines. Further preferably, the differential signal includes a Digital Subscriber Line (DSL) signal, and the signal processing circuitry includes modem circuitry for decoding the DSL signal, most preferably a Very High Rate Digital Subscriber Line (VDSL) signal.

Preferably, the first and second signal windings are wound together in a common winding direction and have substantially equal respective inductances. Further preferably, the common-mode choke includes a core upon which the signal windings and the sampling winding are commonly wound. Preferably, the sampling winding is electrically isolated from the signal windings.

There is also provided, in accordance with a preferred embodiment of the present invention, method for processing a differential signal received on a pair of signal lines, including:

coupling a pair of inductive elements in series with the respective signal lines so as to attenuate commonmode interference in the lines relative to the differential signal;

inductively sampling electrical currents in the inductive elements so as to generate a sampled signal; and processing the differential signal responsive to the sampled signal so as to enhance a signal-to-noise characteristic of the differential signal following the inductive elements.

The present invention will be more fully understood from the following detailed description of the preferred embodiments thereof, taken together with the drawings in which:

DETAILED DESCRIPTION OF A PREFERRED EMBODIMENT

Figure 1:
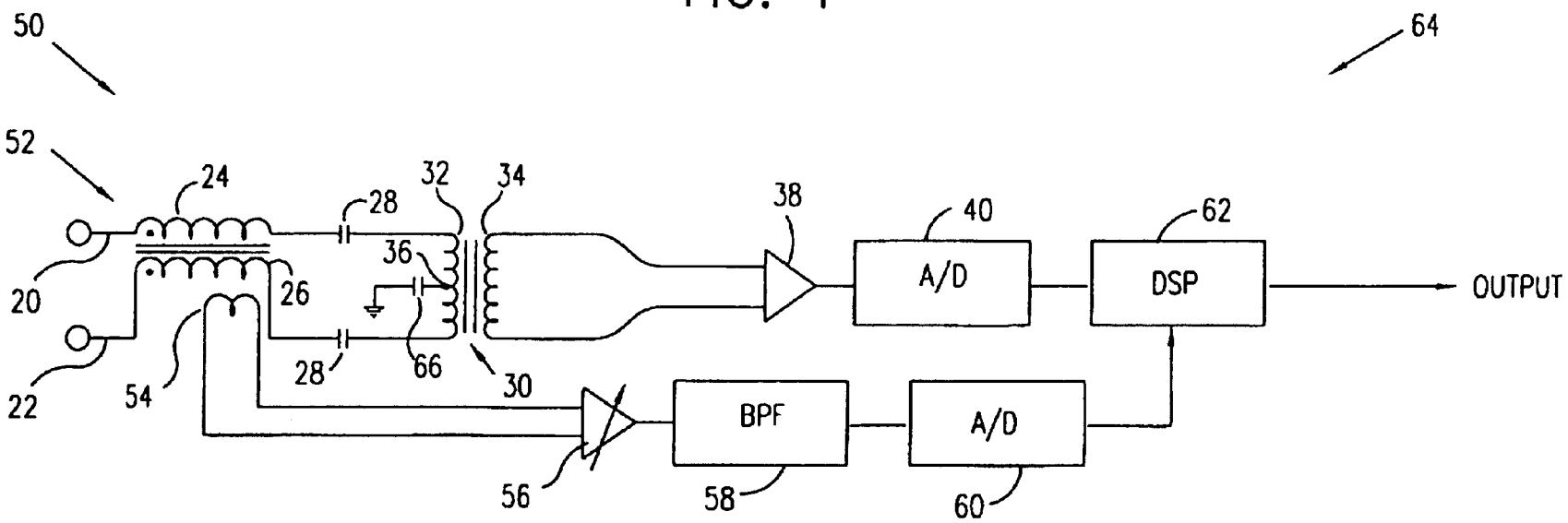
FIG. 1 is a schematic circuit diagram showing a high-frequency data receiver with a three-winding common-mode choke and a noise cancellation circuit, in accordance with a preferred embodiment of the present invention.

FIG. 1 is a schematic circuit diagram showing a receiver 50 for high-speed data signals, in accordance with a preferred embodiment of the present invention. Signals are input to the receiver from input lines 20 and 22 through a common-mode choke 52. Typically, the input lines are twisted pair telephone wires, and the receiver is part of a VDSL modem. Alternatively, receiver 50 may be coupled to input lines of other types and may be adapted to receive and process signals transmitted in accordance with other standards, as are known in the art. Choke 52 comprises parallel signal windings 24 and 26. The output of choke 52 is coupled via capacitors 28, serving as a high pass filter, to a primary winding 32 of a transformer 30. A secondary winding 34 of the transformer is coupled to processing circuitry 64, which processes the signals as described further hereinbelow. Preferably, primary winding 32 has a center tap 36, which is grounded through a capacitor 66, in order to ensure that the input impedance of the receiver is substantially symmetrical in relation to input lines 20 and 22. In the receiver described in the above-mentioned PCT patent application, a center tap of this sort is used for sampling the common-mode noise.

Windings 24 and 26 preferably have substantially equal inductances, $L_1$ and $L_2$, respectively, which are on the order of 1 mH. The windings are wound in parallel and in the same direction, so that choke 52 presents a high overall inductance $L_{common}$ to common-mode interference (or noise) entering receiver 50 through both of lines 20 and 22. On the other hand, a differential data signal, which generates roughly equal and opposite currents in the two windings, encounters effective inductance of only $L_{signal}=L_1-L_2$, which is close to zero if the inductances are well matched. For this reason, it is desirable that the input circuitry of receiver 20 be as symmetrical as possible in order to maximize the signal power and minimize the common-mode interference that reaches transformer 30. Choke 52 thus attenuates common-mode interference substantially relative to the data signal, typically by at least 30 dB.

Signals received from secondary winding 34 of transformer 30 are amplified by a differential amplifier 38 and digitized by an analog/digital (A/D) converter 40, as is known in the art. A digital signal processor (DSP) 62 decodes the digitized signals so as to provide a data output to a computer or other terminal equipment. The DSP also performs a noise cancellation function, as described hereinbelow.

Choke 52 further comprises a sampling winding 54, which is inductively coupled to signal windings 24 and 26. Winding 54 picks up RF interference signals on windings 24 and 26, and particularly common-mode interference from sources such as ham radio broadcasts. The sampling winding is coupled to a differential amplifier 56 having a variable gain, which is adjusted based on the level of interference picked up by the winding. The amplified interference signal is preferably filtered by a band-pass filter 58 to eliminate interference outside a frequency range of interest to receiver 50, generally corresponding to the range of interfering RF signals. An A/D converter 60 digitizes the interference signals and passes the resultant digital data to DSP 62.

The DSP uses the digitized interference signals to make an estimate of the interference that is mixed in with the data signals received from transformer 30. This is the residual noise that has not been attenuated by windings 24 and 26 of choke 52. Any suitable method of noise estimation known in the art may be used in making the estimate. Preferred methods for this purpose are described in a U.S. patent application entitled, "Radio Frequency Interference Canceller," filed on even date, which is assigned to the assignee of the present patent application, and whose disclosure is incorporated herein by reference. The estimated interference is subtracted out of the data signals received by the DSP from A/D converter 40, so that the residual noise is cancelled out of the signals to an extent sufficient to enable the DSP to decode the data accurately and efficiently.

Alternatively, the estimated interference based on the signals sampled by sampling winding 54 may be applied to cancel the residual noise at a different point in circuitry 64. For example, the interference may be subtracted out of the analog signal output by amplifier 38 by an analog subtractor (not shown in the figures). Other applications of the signals sampled by winding 54 in processing the main signals conveyed by windings 24 and 26 will be apparent to those skilled in the art and are considered to be within the scope of the present invention.

Figure 2:
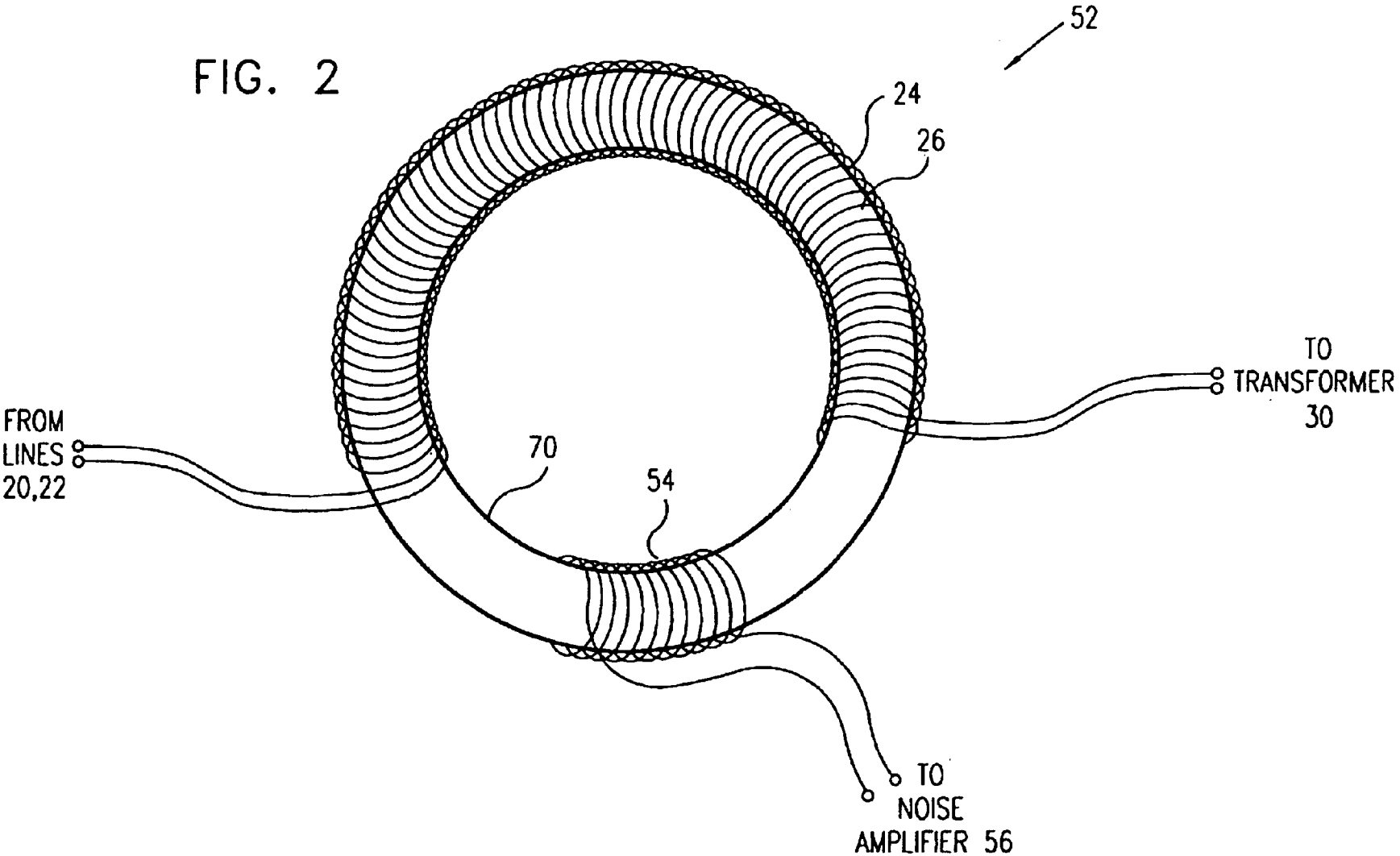
FIG. 2 is a simplified, pictorial illustration of a three-winding common-mode choke, in accordance with a preferred embodiment of the present invention.

FIG. 2 is a schematic, pictorial illustration of common-mode choke 52, particularly adapted for use in receiver 50, in accordance with a preferred embodiment of the present invention. Signal windings 24 and 26 are wound together, in the same direction, around a toroidal core 70 so as to have respective inductances that are as closely as possible identical. Windings 24 and 26 preferably comprise triple-isolated bifilar wire, as is known in the art. Core 70 preferably comprises a high-frequency ferrite with high magnetic permeability, such as Philips 3F3, and is most preferably grounded. Sampling winding 54 is wound on the core so that it picks up the common-mode interference signals that are carried by both of windings 24 and 26 (and generate magnetic fields accordingly in core 70), while receiving almost none of the differential data signals running between the windings. A winding ratio of the sampling winding relative to the signal windings on the order of 1:100 is estimated to provide an optimal sampling output for purposes of noise estimation. It will be understood, however, that different winding ratios and different choke geometries and materials may also be used, depending on application requirements.

Preferably, sampling winding 54 is spaced sufficiently far from signal windings 24 and 26 so as to provide electrical isolation of the sampling winding against electrical surges in lines 20 and 22. These surges may be caused, for example, by lightning, and transformer 30 is required to be capable of isolating circuitry 64 from the effects of such a surge. Appropriate design of choke 52, as illustrated in the figures, alleviates the need for an additional isolation transformer, which would otherwise be required in the interference sampling circuit.

It will be appreciated that the preferred embodiment described above is cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A receiver for high-speed data communications, which is adapted to receive a differential signal through a pair of signal lines, the receiver comprising:

a common-mode choke, comprising:

first and second signal windings, which are configured to be respectively coupled in series to the pair of signal lines so as to attenuate common mode interference in the differential signal; and a sampling winding, which is inductively coupled to the signal windings so as to generate a sampled signal responsive to current flowing in the signal windings; and signal processing circuitry, which is coupled to receive the sampled signal from the sampling winding and to receive the differential signal from the signal windings and to process the differential signal responsive to the sampled signal.

2. A receiver according to claim 1, wherein the sampled signal is generated responsive to the common-mode interference, and wherein the circuitry processes the differential signal to cancel the attenuated common-mode interference out of the differential signal.

3. A receiver according to claim 2, wherein the circuitry processes the sampled signal to derive an estimate of the common-mode interference, which is subtracted from the differential signal.

4. A receiver according to claim 2, wherein the sampled signal is conveyed to the processing circuitry substantially without reference to a ground.

5. A receiver according to claim 1, wherein the sampling winding is electrically isolated from the signal windings.

6. A receiver according to claim 1, and comprising a transformer, which comprises a primary winding coupled to receive the differential signal from the signal windings of the choke and a secondary winding coupled to convey the differential signal to the signal processing circuitry, wherein the primary winding comprises a center tap which is grounded.

7. A receiver according to claim 1, wherein the pair of signal lines comprises a twisted pair of lines.

8. A receiver according to claim 7, wherein the differential signal comprises a Digital Subscriber Line (DSL) signal, and wherein the signal processing circuitry comprises modem circuitry for decoding the DSL signal.

9. A receiver according to claim 8, wherein the Digital Subscriber Line signal comprises a Very High Rate Digital Subscriber Line (VDSL) signal.

10. A receiver according to claim 1, wherein the first and second signal windings are wound together in a common winding direction and have substantially equal respective inductances.

11. A receiver according to claim 1, wherein the common-mode choke comprises a core upon which the signal windings and the sampling winding are commonly wound.

12. A receiver according to claim 1, wherein the sampling winding is electrically isolated from the signal windings.

13. A method for processing a differential signal received on a pair of signal lines, comprising:

coupling a pair of inductive elements in series with the respective signal lines so as to attenuate common-mode interference in the lines relative to the differential signal;

inductively sampling electrical currents in the inductive elements so as to generate a sampled signal; and processing the differential signal responsive to the sampled signal so as to enhance a signal-to-noise characteristic of the differential signal following the inductive elements.

14. A method according to claim 13, wherein inductively sampling the currents comprises sampling the common-mode interference, and wherein processing the differential signal comprises reducing the common-mode interference in the differential signal.

15. A method according to claim 14, wherein reducing the common-mode interference comprises deriving an estimate of the interference and subtracting the estimated interference from the differential signal.

16. A method according to claim 13, wherein the differential signal comprises a Digital Subscriber Line signal.

*17. A differential receiver for high-speed data communications comprising:*

*first and second signal lines receiving a differential signal;*

*an analog-to-digital converter;*

*a common-mode filter connected in series between the first and second signal lines and the analog-to-digital converter, the common-mode filter attenuating common-mode interference in the differential signal;*

*a sampling unit generating a sampled signal responsive to current through the common-mode filter; and*

*signal processing circuitry receiving a filtered signal representative of the differential signal and the sampled signal and processing the filtered signal based upon the sampled signal.*

*18. The differential receiver according to claim 17, wherein the common-mode filter comprises first and second coils respectively connected to the first and second signal lines.*

*19. The differential receiver according to claim 18, wherein the first and second coils present a higher overall inductance to a common mode portion of the differential signal than to a differential portion of the differential signal.*

*20. The differential receiver according to claim 19, further comprising:*

*a high pass filter connected in series between the common-mode filter and the analog-to-digital converter.*

*21. The differential receiver according to claim 20, wherein the high pass filter comprises first and second capacitors respectively connected to the first and second coils.*

*22. The differential receiver according to claim 21, further comprising:*

*a transformer and a differential amplifier connected in series between the first and second capacitors and the analog-to-digital converter.*

*23. The differential receiver according to claim 17, wherein the common-mode filter comprises a sampling coil, the sampling unit receiving a signal representative of the current through the common-mode filter from the sampling unit.*

*24. The differential receiver according to claim 23, further comprising:*

*an interference filter connected in series between the sampling coil and the signal processing circuitry, the filter providing a signal representative of noise within the signal received by the signal processing circuitry from the analog-to-digital converter.*

*25. The differential receiver according to claim 24, further comprising:*

*an interference filter connected in series between the sampling coil and the signal processing circuitry, the filter wherein the filter comprises a sampling coil, the sampling unit receiving a signal representative of the current through the filter from the sampling unit.*

*26. A differential receiver for high-speed data communications comprising:*

*first and second signal lines receiving a differential signal;*

*an analog-to-digital converter; and*

*a common-mode filter connected in series between the first and second signal lines and the analog-to-digital converter, the common-mode filter attenuating common-mode interference in a differential signal.*

*27. A differential receiver for high-speed data communications comprising:*

*first and second signal lines receiving a differential signal;*

*first and second coils respectively connected to the first and second signal lines, the first and second coils attenuating common-mode interference in the differential signal;*

*a sampling coil generating a sampled signal representative of current through the first and second coils; and*

*signal processing circuitry receiving a filtered signal representative of the differential signal and the sampled signal and processing the filtered signal based upon the sampled signal.*

* * * * *